Feb. 14, 1933.　　　W. M. McNEIL　　　1,897,394
GYPSUM CALCINER
Filed Nov. 17, 1930
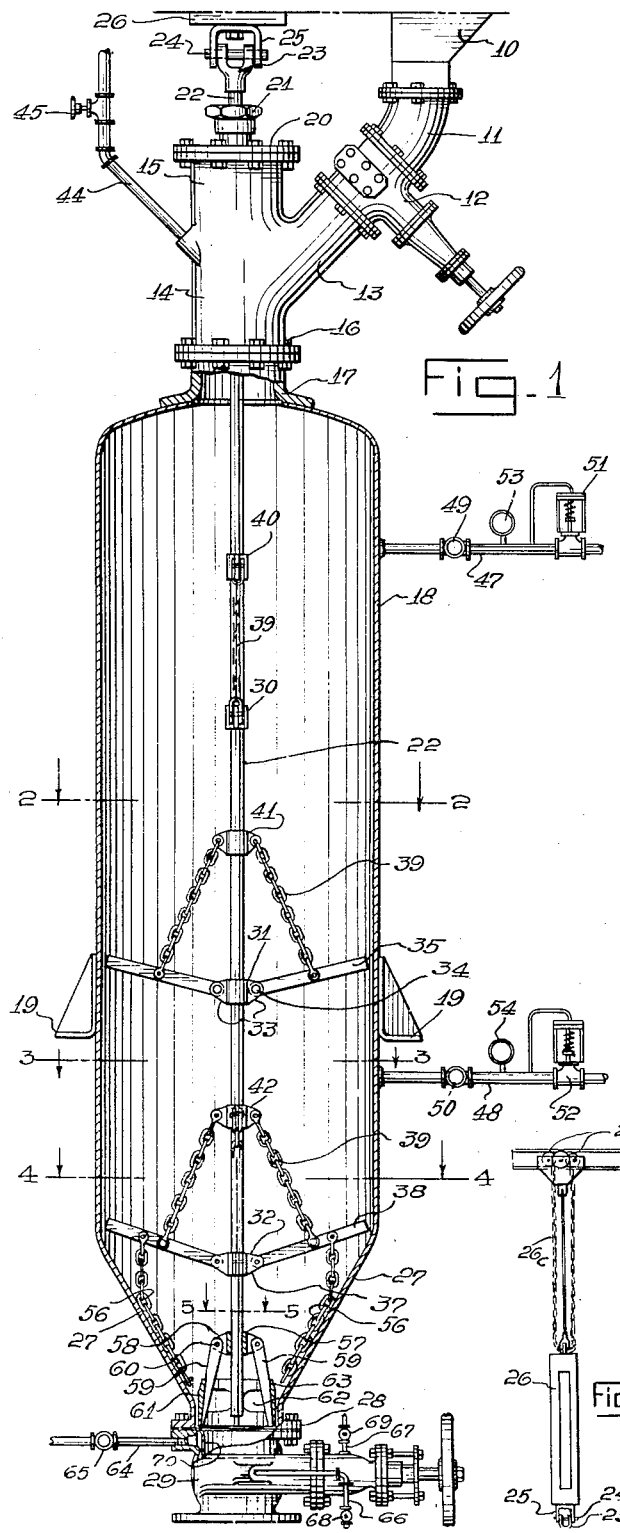
Fig-1
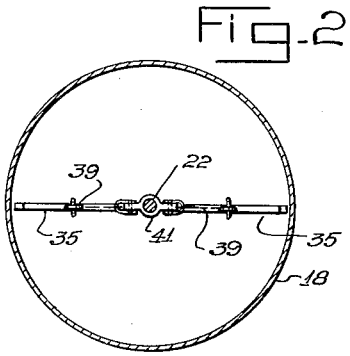
Fig-2
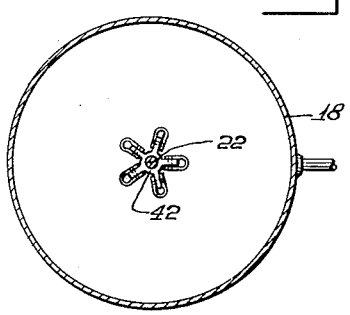
Fig-3
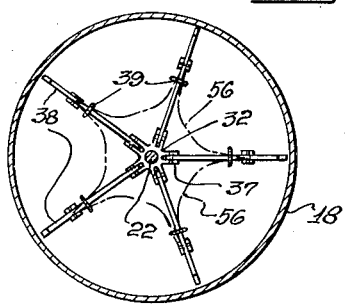
Fig-4
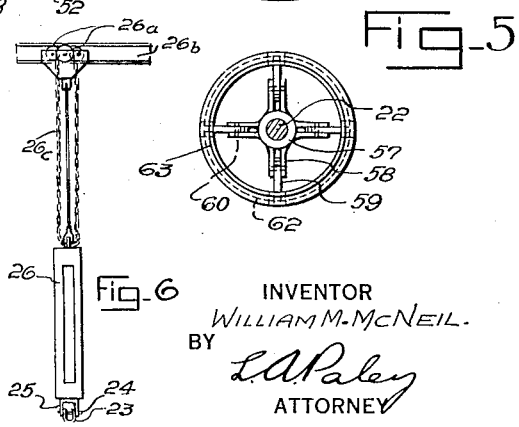
Fig-5
Fig-6
INVENTOR
WILLIAM M. McNEIL.
BY
L. A. Paley
ATTORNEY Patented Feb. 14, 1933

1,897,394

UNITED STATES PATENT OFFICE

WILLIAM M. McNEIL, OF CHICAGO, ILLINOIS, ASSIGNOR TO UNITED STATES GYPSUM COMPANY, OF CHICAGO, ILLINOIS, A CORPORATION OF ILLINOIS

GYPSUM CALCINER

Application filed November 17, 1930. Serial No. 496,074.

This invention relates to an apparatus for heating materials, and has reference more particularly to calciner for producing high strength, calcined gypsum as illustrated and described in the co-pending application of Randel, Dailey and McNeil, Serial No. 473,182 filed August 5th, 1930, of which this application is a continuation in part.

In the above mentioned co-pending application, a method and product is described in which gypsum rock is calcined to produce calcined gypsum having an unusually high strength when cast into shapes. In this co-pending application, a process and apparatus is described in which gypsum rock in lump form is calcined by steam under carefully controlled pressure in a closed vertical extending cylinder. The present application deals more especially with the construction of the calciner.

An object of this invention is to provide a calciner for producing high strength calcined gypsum by the application of steam under carefully controlled pressure.

Another object of the invention is to provide a calciner in which means are provided for rapidly removing the calcined gypsum from the calciner after calcination is complete; also to improve calcining apparatus in other respects hereinafter specified and claimed.

Reference is to be had to the accompanying drawing forming a part of this specification, in which—

Fig. 1 is a sectional elevation of the improved calcining apparatus, and

Figs. 2, 3, 4, and 5 are transverse sectional views taken through the calciner on lines 2—2, 3—3, 4—4 and 5—5 respectively of Fig. 1.

Fig. 6 is an elevation of the supporting means for the vibrator.

The gypsum rock to be calcined is contained in a bin or hopper 10 and passes through a duct 11 having a valve or gate 12, into an arm 13 of a Y pipe fitting 14, the latter having a vertical arm 15. The Y fitting 14 is attached by bolts 16 to a flange 17 formed on the upper end of a vertical, cylindrical, calciner shell 18. This calciner is provided with outstanding brackets 19 for supporting same on suitable framework not shown. The arm 15 of the Y fitting 14 is provided with a cover 20 securely bolted thereto, and a stuffing box 21 is provided in said cover for making a tight, sliding fit with an agitator rod 22 passing upwardly therethrough. A forked bracket 23 is secured to the upper end of rod 22 and a pin 24 passing through said bracket, pivotally connects said bracket with a second U-shaped bracket 25 secured to the lower end of a pneumatic vibrator 26 of standard design. Any other type of reciprocating device may be used for rapidly reciprocating the agitator rod 22 axially in the stuffing box 21 during the rock discharge period. The vibrator 26 is connected by a standard hoist to a suitable supporting framework not shown, so that the agitating devices can be slowly moved up and down as they vibrate to insure that all rock in the calciner is loosened and flows out of the calciner after calcination. The upper end of the pneumatic hammer 26 is preferably arranged with a trolley 26a for traveling on a track 26b positioned above a series of the calciners 18, as more fully disclosed in said co-pending application. A chain or other type of hoist 26c connects the trolley 26a to the vibrator 26 for raising and lowering the latter. The lower end of the calciner shell 18 is preferably formed into a frusto-conical outlet section 27, having steeply inclined sides so as to permit the easy discharge of rock after calcination. The lower end of the section 27 is provided with a flange 28, which is connected to a suitable valve 29 for retaining the rock in the calciner 18 and resisting the steam pressure in said calciner.

The lower end of agitator rod 22 is provided with rigidly secured agitator brackets 30, 31 and 32, the first two of which preferably each have a pair of radially extending pivot arms 33 secured thereto. Pins 34 pivotally connect said arms 33 with the inward end of agitator bars 35, the latter extending radially from the rod 22. It will be noted that the bars 35 on bracket 31 are at right angles to the agitating bars on the bracket 30. The bracket 32 preferably has five pairs of outstanding pivot arms 37, so that five agitator bars 38 are secured to said bracket 32. Chain 39 yieldingly connects the arms 35 to suspension brackets 40, 41 and 42 secured to the rod 22, one above each of the brackets 30, 31 and 32 respectively. By means of this method of suspending the agitator bars 35, the latter may be folded upwardly parallel to the rod 22 when said rod 22 is inserted through the fitting arm 15, and through the flange 17. The bars 35 then fold downwardly under the action of gravity to loosen the rock after the calcination period, and cause same to flow out through the outlet valve 29.

Hot water from a storage tank not shown, flows through a pipe 44 through the Y fitting 14, and from thence into the calciner 18, so as to submerge the rock in hot water prior to calcination and thus utilize the heat in the hot water previously withdrawn from the calciner, raise the temperature of the rock to a temperature of 100–150 degrees F., and also wash fine particles from the rock. The pipe 44 is provided with a valve 45 for controlling the flow of hot water into the calciner 18. Steam for accomplishing the calcination of the rock in calciner 18, is admitted to the calciner through an upper steam pipe 47 and a lower steam pipe 48, suitable hand valves 49 and 50 respectively being provided on the lines 47 and 48 for controlling the admission of steam into the calciner 18. Automatic pressure control valves 51 and 52 are also preferably provided on the lines 47 and 48 respectively, so as to maintain the pressure of steam in the calciner constant during the calcination period. As the steam is admitted to the calciner 18 through pipes 47 and 48, the hot water used in the rock pretreatment is withdrawn from the valve 29 through pipe 64, so that the water is displaced by the steam, thus avoiding any air pockets which might otherwise occur in the calciner 18 if the steam displaced air. Pressure gauges 53 and 54 may also be provided on the lines 47 and 48 respectively, in order to indicate the steam pressure in the calciner 18.

In order to cause the easy discharge of the calcined rock from calciner 18, I suspend a chain 56 from a point near the end of each of the bars 38, so that said chains rest upon the inclined walls of the calciner section 27, and help to loosen the rock when the rod 22 is vibrated axially under the action of the pneumatic hammer 26. I also aid in loosening the rock by securing a bracket 57 to the lower end of rod 22, said bracket having a plurality, such as four, outstanding pairs of arms 58. A bar 59 is secured at its upper end by a pin 60 to each pair of outstanding flanges 58, and a cylindrical discharge collar 61 is welded to the lower ends of said arms 59. Openings 62 are formed in the walls of the collar 61 to permit the rock to flow downwardly through the valve 29, and the upper edge of the collar 61 has a bevelled or sharpened section 63, designed to afford minimum resistance to the flow of rock. The outlet pipe 64 is connected to the valve body 29, and is provided with a hand control valve 65 for controlling the discharge of hot water and water of condensation from the calciner 18. A shield 70 of screen or sheet metal is provided adjacent the inner opening of the pipe 64 to prevent same from becoming plugged up.

The valve 29 has a tendency to plug up and render the closing of the valve difficult. For this reason, I provide a steam pipe 66 connected to the valve body 29 adjacent the seat thereof, and a steam pipe 67 connected to the valve body bonnet, these pipes 66 and 67 being controlled by valves 68 and 69 respectively.

In operation, the rock in lump form to be calcined is introduced into the hopper 10 and when the valve 12 is opened, the rock flows downwardly through duct 11, pipe 13, Y fitting 14 and flange 17 into the calciner 18. The valve 12 is now closed and valve 45 is opened, thus admitting hot water through pipe 44 into the calciner 18 to completely submerge the rock and fill all spaces in the calciner. Valves 49 and 50 are now opened to permit the hot water to flow out. After the water is completely emptied from the calciner 18, valve 65 is closed and calcination under a pressure carefuly regulated by automatic pressure control valves 51 and 52 is continued. When calcination is complete, valve 65 is again opened to remove any water of condensation, and is then closed. Valve 29 is now opened and the pneumatic hammer 26 is put into operation. The rod 22 carrying the agitating bars 35 is rapidly reciprocated axially to loosen the rock while the hoist 26c is used to raise and lower the vibrator 26 and its associated agitating devices, so as to cause the rock to flow outwardly through the valve 29 to any discharge point. The collar 61 aids in loosening the rock and starting the flow from the calciner 18.

I would state in conclusion that while the illustrated example constitutes a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. In an apparatus for calcining lump, earthy material, a vertically extending, elongated, cylindrical container, means for introducing the material into said container, a pipe suitable for introducing steam under pressure into said container so as to accomplish the calcination of said gypsum, a cloture adjacent the bottom of said container for permitting the discharge of calcined rock from said container after calcination, a rod extending longitudinally through said container, agitating means associated with said rod, and means for causing the rapid reciprocation of said rod in said container.

2. In an apparatus for heating materials, a substantially vertically extending cylinder, said cylinder having a restricted opening in the upper end thereof, means for introducing the material to be heated into said container through said opening, a rod extending downwardly through said opening, agitating bars hingedly connected to said rod and adapted to swing downwardly into a lower position after the insertion of said rod through said opening, means for admitting the heating fluid into said container, and means for reciprocating said rod axially, and means adjacent the bottom of said cylinder for causing the discharge of said material from said cylinder.

3. In an apparatus for heating materials, a vertically extending cylindrical container, a Y connection at the top of said container, means for introducing the material to be heated through one arm of said Y connection, an agitating rod passing through the other arm of said Y connection, means for introducing a heating fluid into said container, and means adjacent the bottom of said container for discharging the material from said container.

4. In an apparatus for heating materials, a vertically extending cylindrical container, a frusto-conical discharge section formed on the lower end of said container, means for closing said discharge section, an agitating rod extending into the top of said container and having chains supported thereby and engaging said frusto-conical section, means for reciprocating said rod axially so as to agitate said material and cause its discharge from said container, and means for introducing a heating fluid into said container.

5. In an apparatus for calcining gypsum, a vertically extending cylindrical container, a stuffing box associated with the upper end of said container, an agitating rod passing through said stuffing box to the inside of said container, agitating means associated with said agitating rod, means for reciprocating said rod axially to cause an agitation of the gypsum rock in said container, means for introducing a heating fluid into said container, and means adjacent the bottom of said container for permitting the discharge of the calcined gypsum rock from said container.

6. In an apparatus for heating materials, a vertically extending cylindrical container having a restricted opening in the upper end thereof, an agitating rod passing through said opening into said container, agitating arms hingedly connected to said rod so as to fold inwardly toward said rod while being passed through said opening, and to swing downwardly to a lower position away from said rod after insertion into said container, means for supporting said agitating bars in a lower position, means for reciprocating said agitating rod axially, means for introducing a heating fluid into said container, and means adjacent the bottom of said container for discharging the heated material from said container.

7. In an apparatus for calcining lump, earthy material, a vertically extending cylindrical container, means for introducing the material into said container, a pipe suitable for introducing hot water into said container, a pipe suitable for introducing free steam into said container, means for withdrawing hot water from the bottom of said container, means adjacent the bottom of said container for withdrawing gypsum rock from said container, and agitating means within said container for aiding in the discharge of rock from said container.

8. In an apparatus for heating materials, a vertically extending cylindrical container, an agitating rod passing through the upper end of said container, a pneumatic hammer positioned externally of said container and adapted to cause the axially reciprocation of said rod so as to loosen the material in said container, means for introducing material into said container, means for introducing a heating fluid into said container, and means adjacent the bottom of said container for discharging the heated material from said container.

9. In an apparatus for calcining lump, earthy material, a vertically extending cylindrical container, means for introducing said material into said container, an agitating rod extending into said container, a discharge collar secured to said agitating rod, means for reciprocating said agitating rod axially, a pipe suitable for introducing a heating fluid into said container, and means adjacent the bottom of said container for permitting the discharge of said material.

10. In an apparatus for calcining gypsum, means for containing the gypsum rock to be calcined, a pipe for introducing steam into said container, a discharge opening near the bottom of said container, a valve controlling said discharge opening, means for introducing a fluid into said valve adjacent the seat thereof for cleaning said valve, a pipe for introducing a heating liquid into said container, and means for agitating the gypsum rock in said container to aid in discharging said rock through said discharge opening.

11. In an apparatus for calcining gypsum, means for containing the rock to be calcined, said calcining means being provided with a discharge opening, an agitating device extending through the top of said calciner, means for causing the agitating device to reciprocate vertically to loosen the rock after calcination, means for raising and lowering the agitating device while said device is reciprocating so as to cause the calcined rock to discharge from said calciner through said opening, and means for introducing a heating fluid into said calciner.

WILLIAM M. McNEIL.